United States Patent
Trinkle et al.

(10) Patent No.: US 9,557,175 B2
(45) Date of Patent: *Jan. 31, 2017

(54) FIBER OPTIC GYROSCOPE DEAD BAND ERROR SUPPRESSION

(71) Applicant: Honeywell International Inc., Morristown, NJ (US)

(72) Inventors: William Joseph Trinkle, Arlington, MA (US); William Goethals, New York, NY (US)

(73) Assignee: Honeywell International Inc., Morris Plains, NJ (US)

( * ) Notice: Subject to any disclaimer, the term of this patent is extended or adjusted under 35 U.S.C. 154(b) by 114 days.

This patent is subject to a terminal disclaimer.

(21) Appl. No.: 14/690,979

(22) Filed: Apr. 20, 2015

(65) Prior Publication Data

US 2015/0316381 A1     Nov. 5, 2015

Related U.S. Application Data

(63) Continuation of application No. 13/942,861, filed on Jul. 16, 2013, now Pat. No. 9,140,551.

(51) Int. Cl.
     *G01C 19/72*        (2006.01)

(52) U.S. Cl.
     CPC ........... *G01C 19/721* (2013.01); *G01C 19/726* (2013.01)

(58) Field of Classification Search
     CPC ..... G01B 11/25; G01B 11/02; G01B 11/2513; G02B 13/0005; G02B 27/4233; G02B 3/0056; G02B 27/0961; G02B 27/30; G02B 27/0977; H01S 5/423; F21V 5/007; F21V 5/045; F21V 5/08; G03B 15/06

See application file for complete search history.

(56) References Cited

U.S. PATENT DOCUMENTS 5,020,912 A    6/1991   Pavlath
5,123,741 A    6/1992   Spahlinger
(Continued)

FOREIGN PATENT DOCUMENTS

JP       2005524078      8/2005
JP       2008058303      3/2008
(Continued)

OTHER PUBLICATIONS

Japanese Patent Office, "Notice of Allowance from JP Application No. 2014-095739 mailed May 18, 2015", "from Foreign Counterpart of U.S. Appl. No. 13/942,861", May 18, 2015, pp. 1-4, Published in: JP.

(Continued)

*Primary Examiner* — Tarifur Chowdhury
*Assistant Examiner* — Mohamed K Amara
(74) *Attorney, Agent, or Firm* — Fogg & Powers LLC

(57) ABSTRACT

Embodiments described herein provide for a method of modulating an input light beam of an interferometric fiber optic gyroscope (IFOG). The method includes intermittently jumping a phase step to suppress dead band. If a bit flip was clocked into a digital to analog converter generating the feedback signal at the beginning of a cycle in which the jumped phase step is implemented, the method includes at least one of re-introducing a rate difference corresponding to the bit flip, altering the timing of the bit flip, or altering the timing of the generating a feedback signal based on the jumped phase step.

20 Claims, 5 Drawing Sheets

(56) References Cited

U.S. PATENT DOCUMENTS

| | | | |
|---|---|---|---|
| 5,684,591 | A | 11/1997 | Lo et al. |
| 5,757,490 | A | 5/1998 | Martin |
| 5,767,968 | A | 6/1998 | Strandjord |
| 5,949,545 | A | 9/1999 | Lo et al. |
| 5,999,304 | A | 12/1999 | Sanders |
| 6,476,932 | B1* | 11/2002 | Moizio ............... H03L 7/00 341/120 |
| 6,744,519 | B2 | 6/2004 | Lange et al. |
| 7,911,241 | B1* | 3/2011 | Zeller ............... H03L 7/1976 327/105 |
| 2004/0165190 | A1* | 8/2004 | Chen ............... G01C 19/726 356/464 |

FOREIGN PATENT DOCUMENTS

| | | |
|---|---|---|
| JP | 2010038917 | 2/2010 |
| WO | 9724580 | 4/1997 |
| WO | 03093764 | 11/2003 |
| WO | 2005083357 | 9/2005 |

OTHER PUBLICATIONS

European Patent Office, "Office Action from EP Application No. 14166472.2 mailed Mar. 25, 2015", "from Foreign Counterpart of U.S. Appl. No. 13/942,861", Mar. 25, 2015, pp. 1-5, Published in: EP.

European Patent Office, "European Search Report from EP Application No. 14166472.2 mailed Nov. 21, 2014", "from Foreign Counterpart of U.S. Appl. No. 13/942,861", Nov. 21, 2014, pp. 1-4, Published in: EP.

U.S. Patent and Trademark Office, "Final Office Action", "from U.S. Appl. No. 13/942,861", Nov. 13, 2014, pp. 1-16, Published in: US.

U.S. Patent and Trademark Office, "Notice of Allowance", "from U.S. Appl. No. 13/942,861", Jan. 22, 2015, pp. 1-14, Published in: US.

U.S. Patent and Trademark Office, "Office Action", "from U.S. Appl. No. 13/942,861", Jun. 6, 2014, pp. 1-20, Published in: US.

Chen, "Interferometric Fiber Optic Gyroscope Dead Band Suppression", "Applied Physics Express 1", Jun. 27, 2008, pp. 072501-1 to 072501-3, Publisher: The Japan Society of Applied Physics.

Egorov et al., "Study on Dead Zones of Fiber-Optic Gyros", "Gyroscopy and Navigation", Oct. 28, 2011, pp. 197-207, vol. 2, No. 4, Publisher: Plelades Publishing, Ltd.

Herdman, "Fiber-Optic Gyroscopes", Feb. 11, 2002, pp. 88-95, Publisher: 1998 Scientific Honeyweller.

Spahlinger et al., "Error Compensation via Signal Correlation in High Precision Closed-Loop Fiber Optic Gyros", "SPIE vol. 2837", Feb. 5, 2002, pp. 218-227, vol. 2837.

U.S. Patent and Trademark Office, "Notice of Allowance", "from U.S. Appl. No. 14/690,967", Sep. 20, 2016, pp. 1-30, Published in: US.

* cited by examiner

FIBER OPTIC GYROSCOPE DEAD BAND ERROR SUPPRESSION

CROSS REFERENCE TO RELATED APPLICATIONS

This application is a continuation of U.S. patent application Ser. No. 13/942,861, filed on Jul. 16, 2013, the disclosure of which is incorporated herein by reference.

STATEMENT REGARDING FEDERALLY SPONSORED RESEARCH OR DEVELOPMENT

This invention was made with Government support under N00030-11-C-0005 awarded by the Navy—Draper Labs. The Government has certain rights in the invention.

BACKGROUND

Interferometric fiber optic gyroscopes (IFOGs) are used for sensing inertial rotation. High performance IFOGs are typically setup in a closed loop configuration in order to improve scale factor stability, scale factor linearity, and dynamic range. However, voltage dependent bias errors (VDBEs), such as electrical cross-coupling, polarization, back scatter, and electronic pick up, can cause the loop to become less stable at certain rotation rates. A particular problem is when attempting to sense a rotation rate near zero. Typically, the loop settles to a point where the VDBEs cancel the input rate causing the sensor output signal to be zero over a finite input range. This range is known as the "dead band", "dead zone", or "region of instability".

To mitigate the effect of dead band, dead band error suppression modulation, also referred to as Feedback Spread Spectrum Modulation (FSSM), can be used. FSSM is typically implemented as a phase jump in the feedback signal with random amplitude and a fixed frequency. FSSM (also referred to herein as "jumping the phase step") is described in more detail in U.S. Pat. No. 6,744,519, which is hereby incorporated herein by reference. The result of FSSM is that VDBEs are averaged over the full feedback voltage range, reducing the likelihood of entering into dead band. Since FSSM works by averaging the VDBEs over the full feedback voltage range, the angle random walk (ARW) resulting from VDBEs decreases as the frequency of the phase jumps increases.

In conventional implementations, however, there are other error sources affecting the angle random walk (ARW) that increase as the frequency of phase jumping (also referred to herein as the "FSSM frequency") increases. These error sources are related to losses of phase information during the phase jump and when data is rejected due to the presence of the phase jump. Because there is a noise source that decreases with the frequency of phase jumping and one that increases with the frequency of phase jumping, optimization is performed on a unit-by-unit (individual) basis to determine the FSSM frequency for the unit that provides the least noise. This unit-by-unit optimization is a cost driver during initial unit testing. Additionally, if the dead band errors and/or phase loss errors are large enough; the noise performance of the sensor will be compromised leading to degraded performance.

SUMMARY

Embodiments described herein provide for a method of modulating an input light beam of an interferometric fiber optic gyroscope (IFOG). The method includes intermittently jumping a phase step to suppress dead band. If a bit flip was clocked into a digital to analog converter generating the feedback signal at the beginning of a cycle in which the jumped phase step is implemented, the method includes at least one of re-introducing a rate difference corresponding to the bit flip, altering the timing of the bit flip, or altering the timing of the generating a feedback signal based on the jumped phase step.

DRAWINGS

Embodiments described herein can be more easily understood and further advantages and uses thereof more readily apparent, when considered in view of the description of the preferred embodiments and the following figures.

In accordance with common practice, the various described features are not drawn to scale but are drawn to emphasize features relevant to the present invention. Reference characters denote like elements throughout figures and text.

DETAILED DESCRIPTION

Embodiments described herein provide for methods and apparatus for Frequency Spread Spectrum Modulation (FSSM) to suppress dead band in an interferometric fiber optic gyroscope (IFOG). In an example, such methods implement FSSM in a manner that reduces DAC throw-out errors, which contribute to ARW as the FSSM frequency increases. With the ARW penalty associated with increasing FSSM frequency reduced, a relatively high (higher than would be considered optimal with conventional FSSM implementations) FSSM frequency can be used for all units. This can eliminate the unit-by-unit optimization required to determine the FSSM frequency having the least noise. Using a relatively high FSSM frequency reduces ARW from VDBEs leading to an overall improvement in ARW performance that is repeatable from unit to unit.

Figure 1:
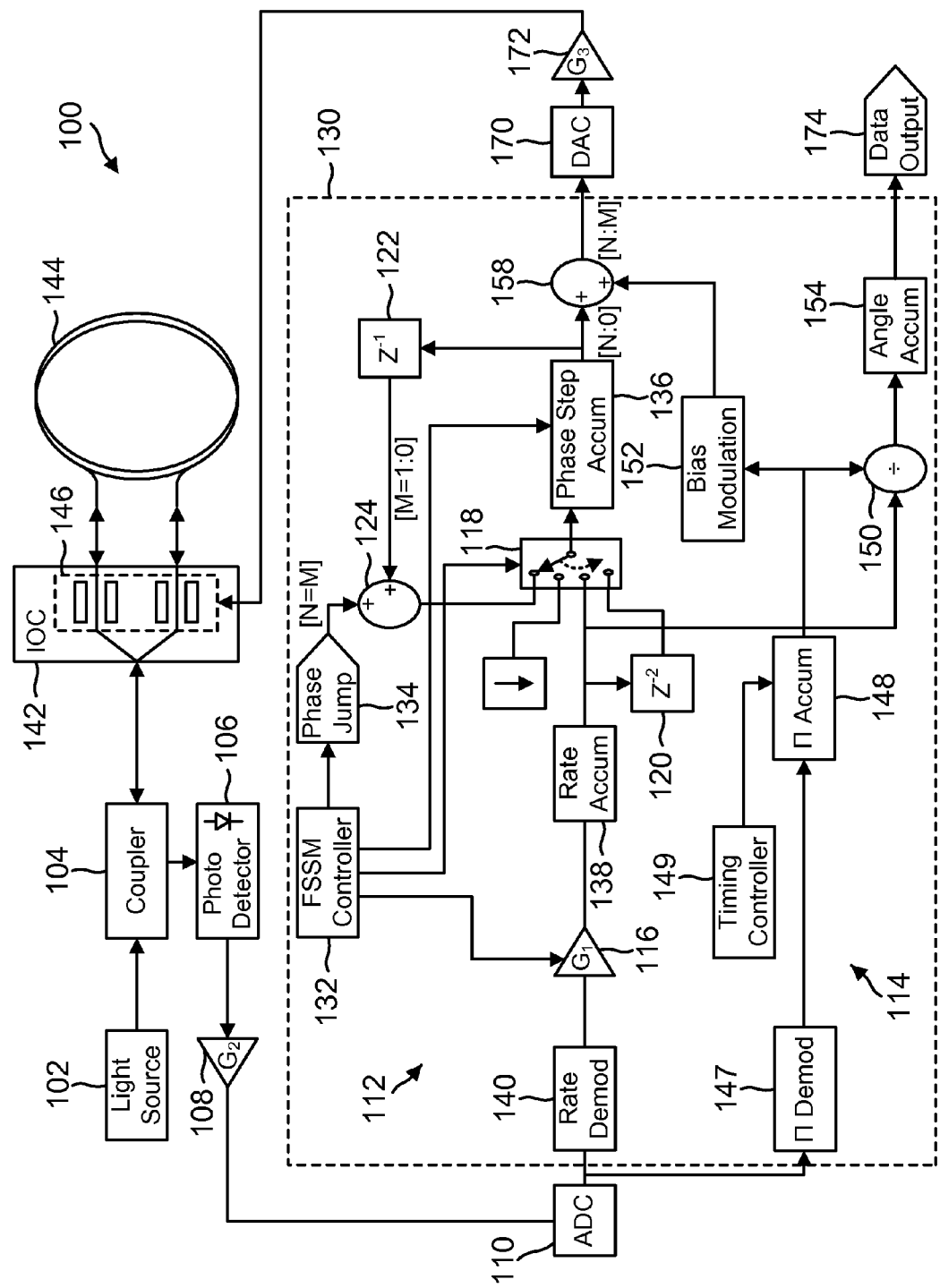
FIG. 1 is a block diagram of an example IFOG including electronics configured to implement dead band error suppression.

FIG. 1 is a block diagram of an example IFOG 100 including loop closure electronics 130 configured to implement dead band error suppression as described herein. The IFOG 100 includes a light source 102, a circulator/coupler 104, an Integrated Optics Chip (IOC) 142, a fiber optic coil 144, a photo detector 106, an amplifier 108, an analog-to-digital converter (ADC) 110, the loop closure electronics 130, a digital-to-analog converter (DAC) 170, an amplifier 172, and a data output point 174.

Light source 102 is any typical fiber light source used by those skilled in the art to manufacture fiber optic gyroscopes. In an example, the light source 102 is a 980 nm semiconductor pump laser containing an erbium fiber and fiber bragg gratings capable of shaping the output wavelength to approximately 1,532 nm with an appropriate bandwidth of 8 nm. The selection of the exact wavelength and bandwidth for the input of light source 102 will depend on the specific application and any required limitations on optical loss and noise level. In addition, light source 102 typically contains an isolator to reduce the amount of light reintroduced back into the light source 102.

Coupler 104 transmits the light emitted by the light source 102 and sends it to IOC 142 and also transmits the light returned from IOC 142 to photo detector 106. In an example, coupler 104 is a standard coupler with two inputs and two outputs (2×2) and a 50/50 splitting. In other examples, a circulator can be used instead of using coupler 104. A coupler is typically more physically compact than a circulator, but can also increase the amount of optical loss in the system. Accordingly, the selection of the coupler/circulator device to be used in the dead band suppression modulation circuit will depend on the desired operational characteristics and design limitations.

IOC 142 is an electro-optical crystal phase modulator used to modulate the light waves traveling in fiber optic coil 144. IOC 142 can include a series of electrodes 146 that are used to modulate the light signal received from circulator/coupler 104. While the subject matter herein may be practiced with various types of phase modulators, in an example, the IOC 142 uses square wave modulation and is fabricated using generic substance LiNbO3. In an example, the IOC 142 includes a "Y" splitter that splits the light wave traveling from circulator/coupler 104 towards fiber optic coil 144 and a re-combiner to rejoin the light waves after the waves travel through fiber optic coil 144 and return back towards photo detector 106. It is desirable to have IOC 142 provide a relatively fast response time.

IOC 142 is a solid-state device and the components of IOC 142 are housed inside the substrate, protecting them from undesirable environmental changes. Inside the IOC 142, the light wave from circulator/coupler 104 is split into two separate signals. One signal will travel a clockwise path through fiber optic coil 144 and the other signal will travel a counter-clockwise path through fiber optic coil 144. After traveling through fiber optic coil 144, the signals are recombined and the difference in the phases of the signals will provide the necessary information to ascertain the rotation rate for IFOG 100.

In addition to the modulation, a phase step signal may also be applied to cancel out the phase difference caused by the rotation. This is called closed-loop operation, because the AC component of the photo diode of the photo detector 106 output will typically be null at or near zero. Alternatively, if IOC 142 provides modulation without the phase step, it is called open loop operation, and the AC signal will be detected at the photo diode. Closed loop operation increases dynamic range, linearity, improves robustness, and improves tolerance to many error sources including light source power.

Fiber optic coil 144 is the sensing coil that is used to detect the rotation of IFOG 100. Fiber optic coil 144 typically has a length in the range of 1 Km to 6 Km, depending on the application. Longer coils require a longer amount of time for the light waves to travel through the fiber optic coil 144 and generally result in a larger and more easily detected phase shift, which means better accuracy. But a longer coil may also be susceptible to additional light degradation and larger temperature variations in the fiber optic coil. Specifically, temperature variations can generate birefringence variation along fiber optic coil 144, thereby introducing optical error. Accordingly, it is desirable to select a length for fiber optic coil 144 that is long enough to produce the required accuracy within the limitations of the operational environment for the proposed application, but no longer than necessary so as to avoid introducing optical error.

The amount of time required for the light wave to traverse the fiber optic coil 144 is called the "loop transit time" and is represented by "$\tau$". One cycle of the IFOG 100 refers to the processes occurring during one loop transit time plus a small amount of time for signal propagation from DAC 170 to the IOC 142 and from IOC 142 to the ADC 110. In an example, the fiber optic coil 144 has a length of approximately 4 Km and will provide a loop transit time of approximately 20 μs.

Photo detector 106 is used to detect the modulated light signal. Photo-detector 106 provides an electrical signal indicative of the output light signals from the fiber optic coil 144 to the amplifier 108.

Amplifier 108 acts as a signal buffer and is used to increase or decrease the overall gain of the output signal received from the photo detector 106. Amplifier 108 provides its output signal to ADC 110.

ADC 110 acts as an interface between the analog and digital signal portions on the input side of loop closure electronics 130 and transforms the analog signal output from amplifier 108 to a digital signal for processing by demodulation loop closure electronics 130. It is desirable that ADC 110 provides a good signal to noise ratio and enough data bits to maintain the level of precision and accuracy dictated by the specific application environment.

Loop closure electronics 130 include a FSSM controller 132, a phase jump generator 134, a rate demodulator 140, a π accumulator 148, a phase step accumulator 136, a bias modulation module 152, an angle accumulator 154, a divider 150, an accumulation point 124, and an accumulation point 158 among other things.

Loop closure electronics 130 typically incorporate two separate loops. The first loop is the "rate loop" 112, including the rate demodulator 140, rate accumulator 138, and phase step accumulator 136. The rate loop 112 is used to sense the rate change in the rotation of fiber optic gyroscope 100. In the rate loop 112, the rate demodulator 140 receives a signal from the ADC 110 and generates rate demodulation value therefrom. The rate accumulator 138 accumulates the rate demodulation value and outputs the raw rate (also referred to as "delta phase" or "phase difference"). The raw rate is input into the phase step accumulator 136. The phase step accumulator 136 accumulates the raw rate and outputs the phase step (also referred to as "phase data"). The phase step is coupled with bias modulation output from the second loop of the loop closure electronics 130 to generate IOC DAC data for the DAC 170.

The second loop is the "π loop" 114, and includes the π demodulator 147, π accumulator 148, and timing controller 149. The π loop 114 provides the bias modulation information and is used to maintain the absolute amplitude of the modulation corresponding to the interference pattern of the recombined light waves. The π demodulator 147 demodulates the output of the ADC 110 to solve for π. The π accumulator 148 accumulates the output from the π demodulator 147 to solve for the correct value of π. The timing controller 149 controls the π accumulator 148 to control when the π calculation is done. The output from the π accumulator 148 sets the amplitude of the bias modulation value from the bias modulation block 152. In some applications, the modulation depth will be π/2, but other modulation depths such as 3π/4 may also be employed, depending on the requirements of the intended application and the deployment environment for IFOG 100.

Bias modulation 152 provides the modulation value which is combined with the phase step from the rate loop 112 to generate the IOC DAC data. Additionally, in some examples, a periodic "dual-ramp" modulation technique is used, although those skilled in the art will appreciate that other modulation techniques may be employed including, for example, square-wave modulation or serrodyne modulation.

The output from rate accumulator 138 is divided by the output from π accumulator 148 at point 150 to give the normalized rate of rotation for IFOG 100 which takes into account errors of the IOC 142. To increase the accuracy of the calculation, the normalized rate is typically integrated at angle accumulator 154 before being sent to data output point 174.

DAC 170 transforms the (digital) IOC DAC data output from loop closure electronics 130 to an analog signal for use in the feedback loop supplied to IOC 142. Amplifier 172 acts as a signal buffer to increase or decrease the overall gain of the output signal from DAC 170.

Data output point 174 is provided as an interface point for connecting IFOG 100 to a computer or other device thereby interfacing IFOG 100 to a larger inertial measurement system.

At the beginning of each cycle, the output from the photo detector 106 via amplifier 108 is clocked in to the ADC 110, thereby generating a digital value corresponding to the output signals from the fiber optic coil 144. Simultaneously with the ADC 110 clocking in, at the beginning of each cycle the DAC 170 clocks in the IOC DAC data from the loop closure electronics 130, thereby generating a feedback signal via amplifier 172 for the IOC 142. During each cycle, the input light to the fiber optic coil is modulated based on the feedback signal generated by the DAC 170 and the input light traverses through the coil. The light outputs the coil and is detected by photo detector 106. Each cycle has a length of time based on the loop transit time such that the ADC 110 clocks in at the appropriate time to capture the output light signals from the fiber optic coil 144. Clocking of the analog signal at ADC 110 and clocking in of a digital value at DAC 170, starts a new cycle.

During each cycle, the loop closure electronics 130 process the digital output from the ADC 110 to generate both an output signal indicative of a rotation rate of the fiber optic coil 144 at data output 174, and the IOC DAC data for DAC 170 for generation of a feedback signal for the IOC 142. In a given cycle, the rate demodulator 140 subtracts the output from the ADC 110 from the output of the previous cycle to demodulate based on the bias modulation used. This operation yields the rate demodulation value. The rate demodulation value may be amplified with amplifier 116 which is controlled by the FSSM controller 132. In a cycle in which a FSSM is not being implemented, the rate demodulation value is not changed by setting the amplifier 116 to unity. The rate demodulation value is then provided to the rate accumulator 138 which accumulates the rate demodulation value to generate the raw rate for the current cycle. In a cycle in which FSSM is not being implemented, the raw rate is provided from the rate accumulator 138 to the phase step accumulator 136. Phase step accumulator 136 accumulates the raw rate and creates the phase step for the current cycle. The phase step is used to adjust the input light to the fiber optic coil 144 to account for rotation rate, in order to maintain the input light in each direction at approximately even transit times. The phase step will be linear if the rotation rate is steady. The input to the phase step accumulator 136 is set by a switch 118 which is controlled by the FSSM controller 132. In a cycle in which FSSM is not being implemented, the switch is set to couple the output from the rate accumulator 138 to the input to the phase step accumulator 136 to generate the phase step. The phase step created by the phase step accumulator 136 is summed with a bias value from the bias modulation 152 at accumulation point 158 to generate DAC IOC data. The bias value is used to modulate the feedback signal. At the beginning of the next cycle, the DAC 170 clocks in the DAC IOC data to generate the feedback signal.

In summary, during a cycle in which FSSM is not being implemented, the ADC 110 clocks in the output signal from the photo detector 106 and loop closure electronics 130 process the digital output from ADC 110 to create the IOC DAC data for the DAC 170. The IOC DAC data is a sum of a phase step and a bias modulation value. At the beginning of the next cycle, the DAC 170 clocks in the IOC DAC data to generate the feedback signal for the IOC 142.

To implement FSSM, the FSSM controller 132 causes a phase jump in the feedback signal. The FSSM controller 132 causes a phase jump by causing an artificial phase step (i.e., a phase step that doesn't correspond to the raw rate) to be generated that is configured to cause a phase jump in the feedback signal. Such a phase step is referred to herein as a "jumped phase step". The jumped phase step replaces a current phase step in the rate accumulator 138. The jumped phase step from the rate accumulator 138 is the summed with the bias modulation value at summation point 158 to create IOC DAC data. This IOC DAC data is input into the DAC 170 to generate a feedback signal implementing a phase jump.

The magnitude of phase jump of the feedback signal is controlled by the FSSM controller 132 by controlling the magnitude of the jumped phase step. The jumped phase step can be set to have a large enough magnitude to move the sensor output signal out of the dead band region, which reduces invalid outputs from IFOG 100 at low rotation rates. By generating a sufficient number of phase jumps within a given time period, as determined by the magnitude of the voltage dependent feedback errors, the loop closure electronics 130 will average the VDBEs over the full feedback voltage range. This error averaging process effectively reduces the voltage-dependent errors and allows the loop closure electronics 130 to sense the actual rate of rotation for the IFOG 100.

The frequency of phase jumps is controlled by the FSSM controller 132 and can be set large enough such that the ARW, resulting from randomization of the dead band errors, is low enough to meet performance requirements of the application. Depending on the implementation of the loop closure electronics 130, the frequency and amplitude of the phase jumps can be set in software, firmware, or hardware. In an example, the frequency of the phase jumps can be set in registers of the FSSM controller 132. The amplitude and frequency of phase jumps may be fixed at respective values, or may be variable (e.g., random) within a range to ensure appropriate operation.

Although a specific electronic circuit configuration has been shown in FIG. 1, it should be noted that other types of circuit implementations could be readily adapted by those skilled in the art. For example, all or part of the acts of loop closure electronics 130 described herein can be implemented using one or more computing units, such as one or more microprocessors (e.g., digital signal processor(s)), an application specific integrated circuit (ASIC), or a field programmable gate array (FPGA). An analog circuit could also accomplish the acts. The blocks described with respect to loop closure electronics 130 can be implemented as software or firmware modules including instructions configured to cause the computing units to implement the functions of the respective block.

Figure 2A:
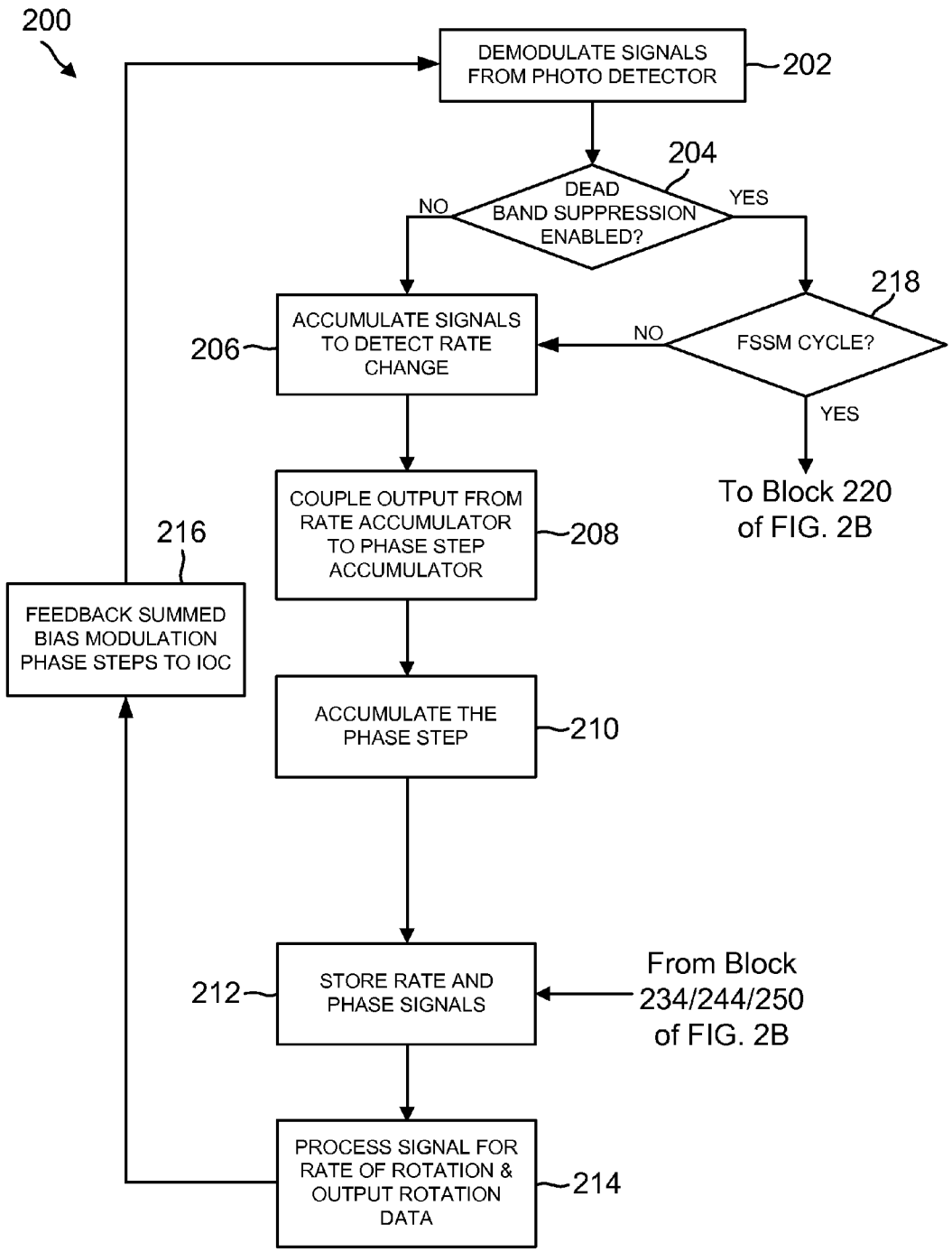
FIGS. 2A and 2B are a flow diagram of an example method for operation of an IFOG including dead band error suppression.
Figure 2B:
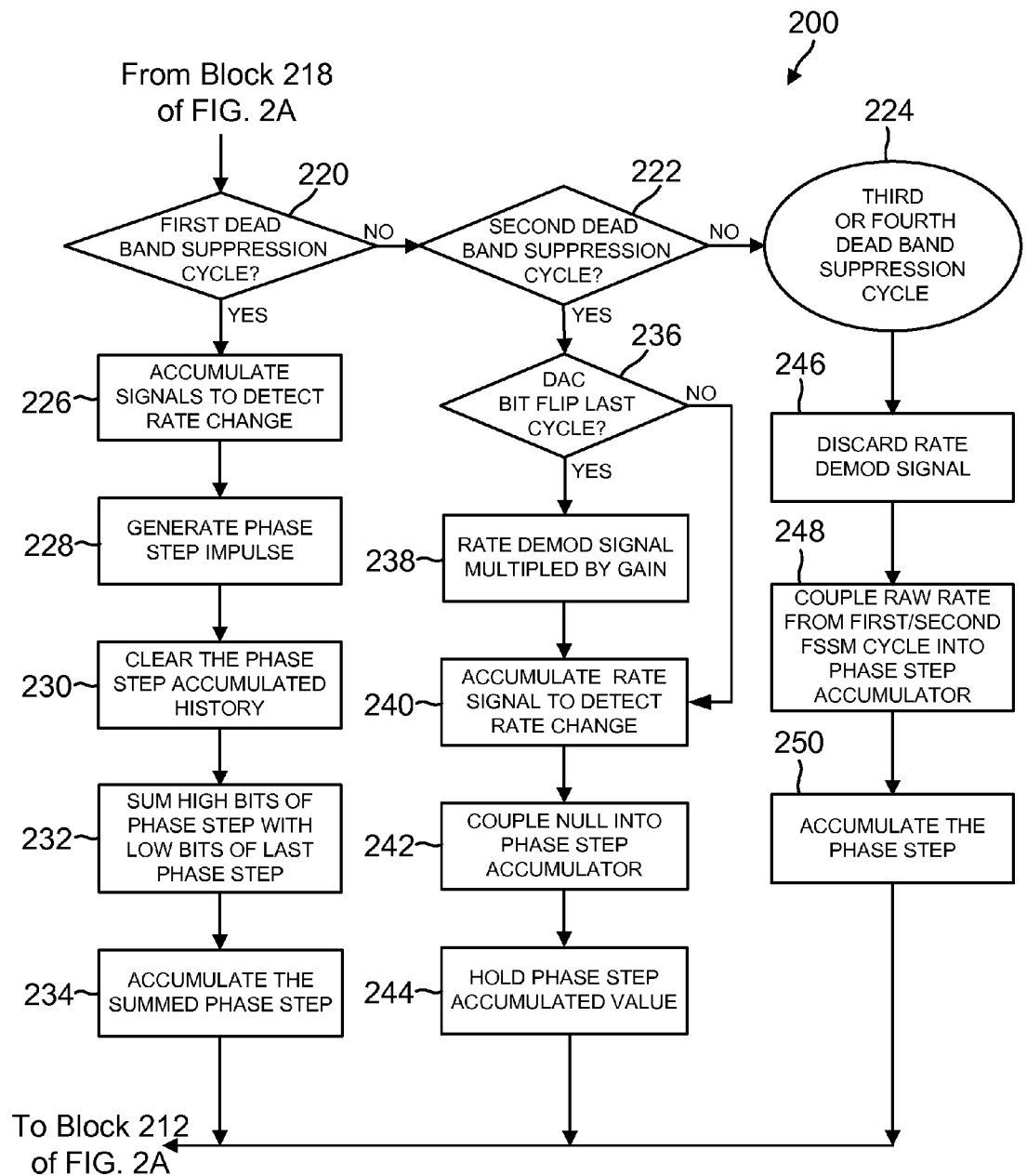

Referring now to FIGS. 1, 2A, and 2B, a method 200 for dead band suppression modulation is shown. As shown in FIGS. 2A and 2B, in each cycle, the digital output from ADC 110 is demodulated by the rate demodulator 140 (block 202). If dead band suppression (FSSM) is disabled for a given cycle (block 204), output from the ADC 110 is processed as described above to generate a feedback signal. In particular, during such a non-FSSM cycle, the output from the demodulator 140 is accumulated by the rate accumulator 138 to generate a raw rate for detecting a rate change (block 206). The switch 118 is set to couple the output (raw rate) from the rate accumulator 138 to the phase step accumulator 136 (block 208). The raw rate from the rate accumulator 138 is accumulated by the phase step accumulator 136 (block 210) as described above to generate the phase step. The non-FFSM cycle continues by storing the raw rate and phase step in respective buffers 120 and 122 (block 212). The buffer 120 stores the raw rate for the two most recent cycles and the buffer 122 stores the phase step for the single most recent cycle. In other words, at the end of the non-FSSM cycle, the buffer 120 includes the raw rate for the non-FSSM cycle and the previous cycle, while the buffer 122 includes the phase step for the non-FSSM cycle. The stored raw rate and phase step may be used during FSSM implementation as described below. Meanwhile during the non-FSSM cycle, the π loop 114 processes the output from the π demodulator 147 and the raw rate from the rate accumulator 138 to generate the output at data output point 174 that is indicative of the rate of rotation of the fiber optic coil 144, and to generate a bias value (block 214). The bias value is summed with the phase step to generate the IOC DAC data for the DAC 170 for the non-FSSM cycle. Referring back to the beginning of the non-FSSM cycle, while the ADC 110 clocks-in the output from the photo-detector 106, the DAC 170 clocks-in the IOC DAC data generated by the loop closure electronics 130 during the previous cycle to generate a feedback signal (block 216). During the (current) non-FSSM cycle, the IOC 142 modulates the input light to the fiber optic coil 144 based on the feedback signal, and the input light travels through the fiber optic coil 144. In this example, along with demodulating the signals from the photo detector 106 (block 202), the acts of storing the raw rate and phase step in respective buffers 120, 122, generating an output indicative of rotation rate (block 214), and generating the feedback signal (block 216) are performed during each cycle.

At the beginning of the next cycle, the ADC 110 clocks in a signal from the photo detector 106 corresponding to the light traveling through the fiber optic coil during the non-FSSM cycle, and the DAC 170 clocks in the DAC IOC data generated by the loop closure electronics 130 during the non-FSSM cycle.

Referring back to block 204, if dead band suppression (FSSM) is enabled, the FSSM controller 132 determines whether to implement FSSM for the current cycle (block 218). The FSSM controller 132 determines whether one of the FSSM cycles is being implemented for a given cycle. Implementation of a phase jump by the FSSM controller 132 spans four consecutive cycles. Thus, once the FSSM controller decides to implement a phase jump, FSSM is implemented during the next four cycles. The FSSM controller 132 determines when to implement a phase jump based on the frequency of the phase jumps as discussed above. If the FSSM controller 132 determines that the current cycle is not one of the 4 cycles in which FSSM is implemented, the output from the ADC 110 is processed to generate a feedback signal in a non-FSSM cycle as described above (blocks 206, 208, 210). If the FSSM controller 132 determines that FSSM will be implemented for the current cycle, the method progresses to block 220 to implement FSSM for the current cycle.

The four consecutive FSSM cycles are referred to herein as the first FSSM cycle, second FSSM cycle, third FSSM cycle, and fourth FSSM cycle. Initially in implementing FSSM, it is determined which FSSM cycle is being implemented (blocks 220, 222, 224).

If this is the first FSSM cycle in the FSSM implementation (i.e., the last cycle was a non-FSSM cycle), the rate demodulation value from the demodulator 140 is accumulated by the rate accumulator 138 to generate a raw rate (block 226). It should be noted that this raw rate corresponds to the signals in the fiber optic coil 144 during the previous (non-FSSM) cycle.

In this first FSSM cycle, the loop closure electronics 130 replace the phase step with a jumped phase step to implement a phase jump for FSSM. To do this, the FSSM controller 132 triggers the phase jump generator 134 to generate a phase jump impulse (block 228) from which the jumped phase step is generated. The FSSM controller 132 also clears the accumulated history of the phase step accumulator 136 to enable a jumped phase step to replace the current phase step (block 230).

Each phase step (including each jumped phase step) generated by the loop closure electronics 130 is composed of a whole value and a fractional value. The whole value is the one or more most significant bits of the phase step, where the number of the one or more most significant bits is the number of bits operated on by the DAC 170. That is, the loop closure electronics 130 may generate a phase step consisting of a given number of bits (e.g., 32 bits), but the DAC 170 may operate on fewer bits (such as a 12 or 16 bit DAC). In such examples, the loop closure electronics 130 have a higher resolution than the DAC 170 and only the one or more most significant bits from the IOC DAC data generated by the loop closure electronics 130 are input into the DAC 170. The fractional value of the phase step is the remaining (least significant) bits of the phase step not including the whole value. The fraction value, therefore, includes the bits of the phase step that do not cause a change in the output of the DAC 170. As used herein, a change in the output of the DAC 170 due to the phase step is also referred to as a bit flip, and it corresponds to a change for the whole value of the phase step.

In an example, the loop closure electronics 130 generate a phase step having 32 bits, but the DAC 170 operates on 16 bits. In such an example, the whole value portion of the phase step is the 16 most significant bits thereof, and the fractional value is the 16 least significant bits of the phase step. In other examples, the phase step and/or DAC 170 may have/operate on a different number of bits.

The phase jump impulse is a whole value having a large enough magnitude to move the sensor output signal out of the dead band region. The magnitude of a phase jump impulse is controlled by the FSSM controller 132 to control the magnitude of the jumped phase step and, in turn, the magnitude of the phase jump. In an example, the phase jump impulse is a whole value having such a sufficient magnitude, with zero fractional value. This phase jump impulse is then summed with the fractional value of the phase step from the previous cycle at summation point 124 (block 232) to generate a jumped phase step. Summing the fractional value of the phase step of the previous cycle with the phase jump impulse, causes this factional value to be maintained, rather than lost, after a phase jump. Loss of this fractional value would result in loss of phase information, which increases ARW. Thus, maintaining this fraction value reduces ARW caused by FSSM (i.e., caused by a phase jump).

The jumped phase step from the summation point 124 is then input into the phase step accumulator 136 (block 234). Since the phase step accumulator 136 had its accumulated history cleared (block 230), the jumped phase step is accumulated with zero. Thus, the phase step in the phase step accumulator 136 for the first FSSM cycle is the jumped phase step. The FSSM controller 132 sets the switch 118 to couple the summation point 124 to the phase step accumulator 136 to cause the jumped phase step to be input into the phase step accumulator 136.

The first FSSM cycle continues with storing of the raw rate and the jumped phase step for the first FSSM cycle in the buffers 120 and 122 respectively (block 212). Meanwhile, the it loop 114 processes the output from the π demodulator 147 and the raw rate from the rate accumulator 138 to generate the output at data output point 174 that is indicative of the rate of rotation of the fiber optic coil 144, and to generate a bias value (block 214). The bias value is summed with the jumped phase step to generate the IOC DAC data for the DAC 170 for the first FSSM cycle (block 214).

Referring back to the beginning of the first FSSM cycle, while the loop closure electronics 130 are processing the output from the ADC 110, the DAC 170 generates a feedback signal from the IOC DAC data of the previous (non-FSSM) cycle (block 216). The IOC 142 modulates the input light to the fiber optic coil 144 based on the feedback signal, and the input light travels through the fiber optic coil 144.

At the beginning of the next cycle (the second FSSM cycle), the ADC 110 clocks in a signal from the photo detector 106 corresponding to the light traveling through the fiber optic coil during the first FSSM cycle, and the DAC 170 clocks in the DAC IOC data generated by the loop closure electronics 130 during the first FSSM cycle. Since the DAC IOC data for the first FSSM cycle includes the jumped phase step, clocking in by the DAC 170 during this next (second FSSM) cycle, generates a feedback signal that implements a phase jump in the input light to the fiber optic coil 144. Referring back to block 202, the digital output from ADC 110 is demodulated by the rate demodulator 140. Dead band suppression (FSSM) is enabled (block 204), and the FSSM controller 132 determines that it is implementing FSSM for the current cycle (block 218) since it is within the four cycle span of FSSM implementation.

The FSSM controller 132 then determines that this cycle is the second FSSM cycle (block 222). Accordingly, the FSSM controller 132 determines whether there was a bit flip in the DAC 170 during the previous (first FSSM) cycle (block 236). Since the DAC 170 clocked in the IOC DAC data corresponding to the jumped phase step at the beginning of the current (second FSSM) cycle, the IOC DAC data clocked in to the DAC 170 for the previous cycle is the value clocked in at the beginning of the first FSSM cycle, which is the IOC DAC data generated by the non-FSSM cycle previous to the first FSSM cycle. If that non-FSSM cycle caused a bit flip in the DAC 170 (a change in the whole value of the phase step), then the jumped phase step of the first FSSM cycle will cause the effects of that bit flip to be lost, since the jumped phase step causes a random change in the phase step. Due to rate demodulation, changes in IOC DAC data (e.g., a bit flip) will affect two cycles of the rate demodulation value. A bit flip in the DAC in the first FSSM cycle will show up in the rate demodulation value during the second and third FSSM cycles. The phase jump, which flips in the DAC during the second FSSM cycle, will corrupt the rate demodulation value in the third and fourth FSSM cycles. The corrupted data in the third FSSM cycle results in half (one of two cycles) of the first FSSM cycle bit flip in the DAC effects to be lost. The lost effects of the bit flip during a phase jump result in "DAC throw-out error". In order to reduce DAC throw-out error, the FSSM controller 132 can take action to either re-introduce the effects a bit flip occurring after a phase step or alter the timing of the bit flip or phase step such that the effects of the bit flip are not lost.

Figure 3:
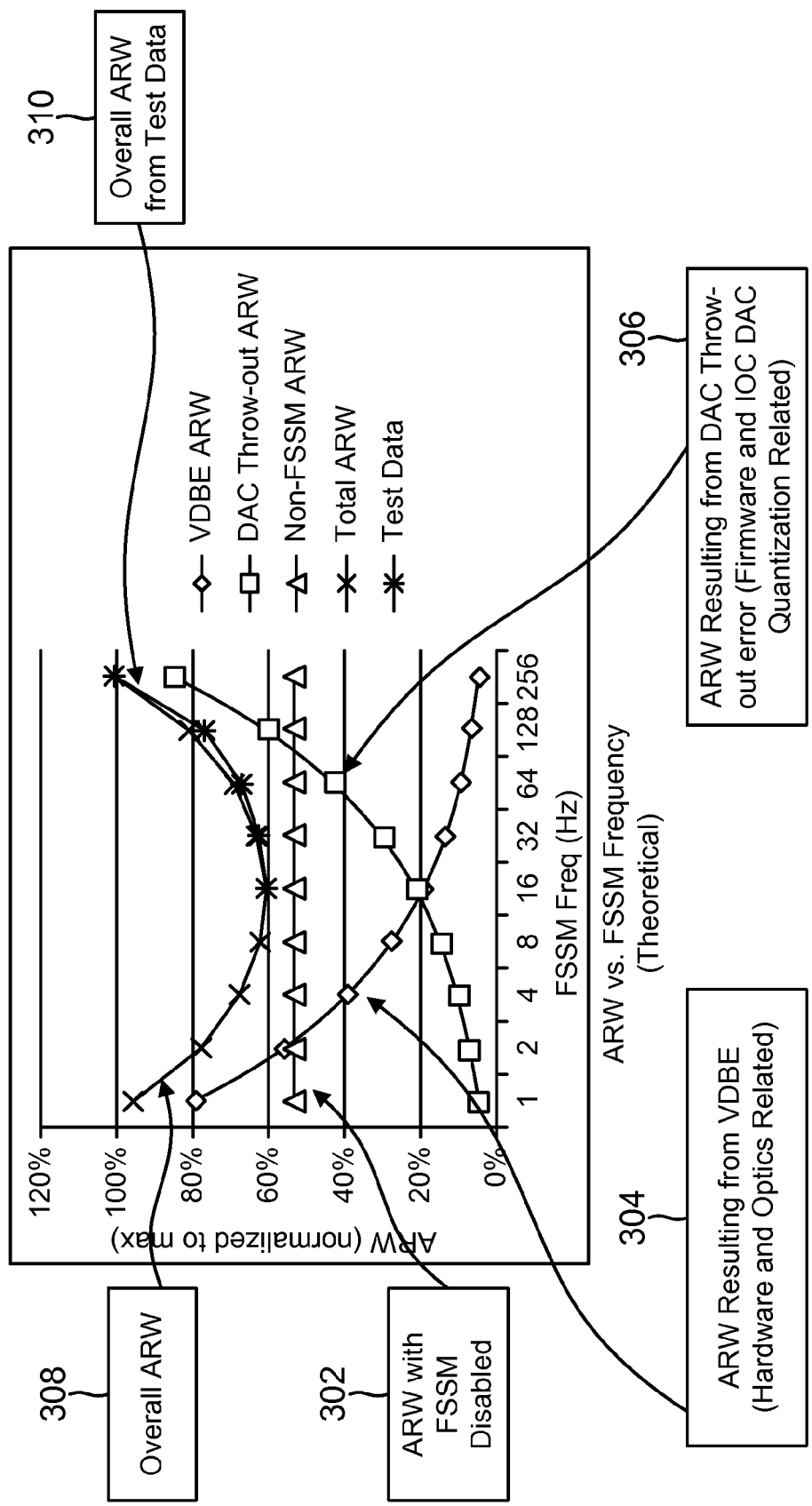
FIG. 3 is a graph illustrating example ARW related curves for a conventional IFOG.

In a first example of reducing such DAC throw-out error (which is illustrated in FIG. 3), a gain of the amplifier 116 is doubled during the second FSSM cycle in order to double the rate demodulated value provided to the rate accumulator 138 (block 238). Doubling the rate demodulated value re-introduces the effects of a bit flip after a phase jump by including its effects twice (hence the doubling) in the second FSSM cycle. Thus, the effects that would have occurred during the third FSSM cycle were it not for the phase jump are included in the second FSSM cycle.

If there was not bit flip prior to the phase jump, the rate demodulated value is not doubled and remains at its value as outputted from the rate demodulator 140. Whether or not the rate demodulated value has been doubled, the rate accumulator 138 accumulates the rate demodulated value to generate the raw rate (block 240). The FSSM controller 132 sets the switch 118 to couple the phase step accumulator 136 to input a null (e.g., ground) value (block 242), and the null value is accumulated by the phase step accumulator 136 to hold the phase step at the previous value.

In a second example of reducing such DAC throw-out error, the bit flip of the DAC 170 at the beginning of the first FSSM cycle can be accounted for by adding in the lost fractional value to the phase step accumulator 136 in one of the second, third, or fourth cycles.

In a third example of reducing such DAC throw-out error, the phase jump is delayed for one or more cycles to allow the bit flip of the DAC 170 to propagate through the IFOG 100. In one implementation of such an example, if, during the first FSSM cycle, the FSSM controller 132 determines that a bit flip occurred at the beginning of that cycle (the first FSSM cycle), the FSSM controller 132 can delay generating the jumped phase step for one or more cycles.

In a fourth example of reducing such DAC throw-out error, the bit flip is delayed if the bit flip is to occur immediately before a phase jump is to be implemented. In one implementation of such an example, the FSSM controller 132 watches the phase step in the phase step accumulator 136 in one or more cycles immediately prior to implementing FSSM. If the whole value of the phase step changes during any of those cycles, the FSSM controller adjusts the whole value of the phase step back to the previous value such that a bit flip does not occur. The FSSM controller 132 then adds the value back into the phase step after implementing of the FSSM.

The second FSSM cycle continues with storing of the raw rate and phase step for the second FSSM cycle in the buffers 120 and 122 respectively (block 212). Meanwhile, the it loop 114 processes the output from the π accumulator 148 and the raw rate for the second FSSM cycle from the rate accumulator 138 to generate the output at data output point 174 that is indicative of the rate of rotation of the fiber optic coil 144, and to generate a bias value (block 214). The bias value is summed with the phase step to generate the IOC DAC data for the DAC 170 for the second FSSM cycle.

At the beginning of the next (third FSSM) cycle, the ADC 110 clocks in a signal from the photo detector 106 corresponding to the light traveling through the fiber optic coil during the second FSSM cycle. As discussed above, the light traveling though the fiber optic coil during the second FSSM cycle has the phase jump implemented therein. Also at the beginning of the third FSSM cycle, the DAC 170 clocks in the IOC DAC data generated by the loop closure electronics 130 during the second FSSM cycle. This IOC DAC data for the second FSSM cycle has a phase step that is unchanged from the previous (second FSSM) cycle (the jumped phase step). Thus, the only change to the feedback signal comes from a change in the bias value. Referring back to block 202, the digital output from ADC 110 is demodulated by the rate demodulator 140. Dead band suppression (FSSM) is enabled (block 204), and the FSSM controller 132 determines that it is implementing FSSM for the current cycle (block 218) since it is within the four cycle span of FSSM implementation.

The FSSM controller 132 then determines that this cycle is the third FSSM cycle (block 224). Since the output clocked in by the ADC 110 at the beginning of this third FSSM cycle corresponded to the light in the fiber optic coil having the phase jump, the rate demodulated value calculated by the rate demodulator 140 is corrupt. Accordingly, the FSSM controller 132 discards the rate demodulated value from the rate demodulator 140 by, for example, setting the gain of the amplifier 116 to zero (block 246). This causes the rate accumulator 138 to hold the raw rate at the previous value. Also, one of the raw rates stored in the buffer 120 is used as the raw rate input into the phase step accumulator 136. To do this, the FSSM controller 132 sets the switch 118 to couple the input of the phase step accumulator 136 to the buffer 120 (block 248). The FIFO buffer 120 outputs the raw rate from two cycles previous (the first FSSM cycle). The phase step accumulator 136 accumulates this raw rate (from the first FSSM cycle) to create the phase step for the third FSSM cycle (block 250).

The third FSSM cycle continues with storing of the raw rate and the phase step for the third FSSM cycle in the buffers 120 and 122 respectively (block 212). Meanwhile, in the it loop 114, the π accumulator 148 does not accumulate during any of the FSSM cycles as controlled by the timing controller 149. As such, the data that goes to the angle accumulator 154 is accurate from the it end. The bias modulation 152 can create a bias value which is summed with the phase step for the third FSSM cycle to generate DAC IOC data for the DAC 170.

At the beginning of the next (fourth FSSM) cycle, the ADC 110 clocks in a signal from the photo detector 106 corresponding to the light traveling through the fiber optic coil during the third FSSM cycle. Also at the beginning of the fourth FSSM cycle, the DAC 170 clocks in the IOC DAC data generated by the loop closure electronics 130 during the third FSSM cycle. Referring back to block 202, the digital output from ADC 110 is demodulated by the rate demodulator 140. Dead band suppression (FSSM) is enabled (block 204), and the FSSM controller 132 determines that it is implementing FSSM for the current cycle (block 218) since it is within the four cycle span of FSSM implementation.

The FSSM controller 132 then determines that this cycle is the fourth FSSM cycle (block 224). The fourth FSSM cycle operates the same as the third FSSM cycle. Since the rate demodulator 140 compares the previous output from the ADC 110 to the current output, the rate demodulated value calculated during the fourth FSSM cycle still has the effects of the phase jump and is therefore corrupt. Accordingly, the FSSM controller 132 discards the rate demodulated value from the rate demodulator 140 by, for example, setting the gain of the amplifier 116 to zero (block 246). This causes the rate accumulator 138 to hold the raw rate at the previous value again. Also, one of the raw rates stored in the buffer 120 is used as the raw rate input into the phase step accumulator 136. To do this, the FSSM controller 132 sets the switch 118 to couple the input of the phase step accumulator to the buffer 120 (block 248). The FIFO buffer 120 outputs the raw rate from two cycles previous (the second FSSM cycle). The phase step accumulator 136 accumulates this raw rate (from the second FSSM cycle) to create the phase step for the fourth FSSM cycle (block 250). Notably, if the rate demodulated value was doubled in the second FSSM cycle to account for a bit flip, the raw rate corresponding to that doubled rate demodulated value was stored in the buffer 120 and is now accumulated by the phase step accumulator 136 in the fourth FSSM cycle. Accordingly, this mitigates the negation of half of the bit flip due to the phase jump.

The fourth FSSM cycle continues with storing of the raw rate and the phase step for the fourth FSSM cycle in the buffers 120 and 122 respectively (block 212). Meanwhile, in the it loop 114, the π accumulator 148 does not accumulate during any of the FSSM cycles as controlled by the timing controller 149. As such, the data that goes to the angle accumulator 154 is accurate from the it end. The bias modulation 152 can create a bias value which is summed with the phase step for the fourth FSSM cycle to generate DAC IOC data for the DAC 170.

At the beginning of the next cycle, the ADC 110 clocks in a signal from the photo detector 106 corresponding to the light traveling through the fiber optic coil during the fourth FSSM cycle. Also at the beginning of the next cycle, the DAC 170 clocks in the DAC IOC data generated by the loop closure electronics 130 during the fourth FSSM cycle. Referring back to block 202, the digital output from ADC 110 is demodulated by the rate demodulator 140. Dead band suppression (FSSM) is enabled (block 204), and the FSSM controller 132 determines that it is not implementing FSSM for the current cycle (block 218) since the four cycle span of FSSM implementation is passed. Accordingly, the loop closure electronics 130 implement a non-FSSM cycle through blocks 206, 208, and 210 as discussed above.

The loop closure electronics 130 continue to implement non-FSSM cycles, until the FSSM controller 132 determines that it is time to implement FSSM again.

FIG. 3 is a graph illustrating ARW of a conventional IFOG 100 implementing FSSM. As shown, when FSSM is disabled (line 302), FSSM does not affect ARW. When FSSM is enabled, there are two factors affecting ARW. The ARW resulting from voltage dependent bias error (VDBE) (line 304) reduces as the frequency of phase jumps (FSSM) increases, while the ARW resulting from throw-out error of the DAC 170 (line 306) increases and the frequency of FSSM increases. VDBE is a hardware and optics related error and DAC throw-out error is a firmware, IOC 142, and DAC 170 quantization related error. Accordingly, the overall ARW (line 308) has a generally parabolic shape with the lowest ARW somewhere in the middle. The low point of the overall ARW varies from product to product. Therefore conventional IFOGs 100 undergo a unit-by-unit optimization to determine the optimal FSSM frequency. FIG. 3 also illustrates test data (line 310) which coincides with the theoretical overall ARW.

Figure 4:
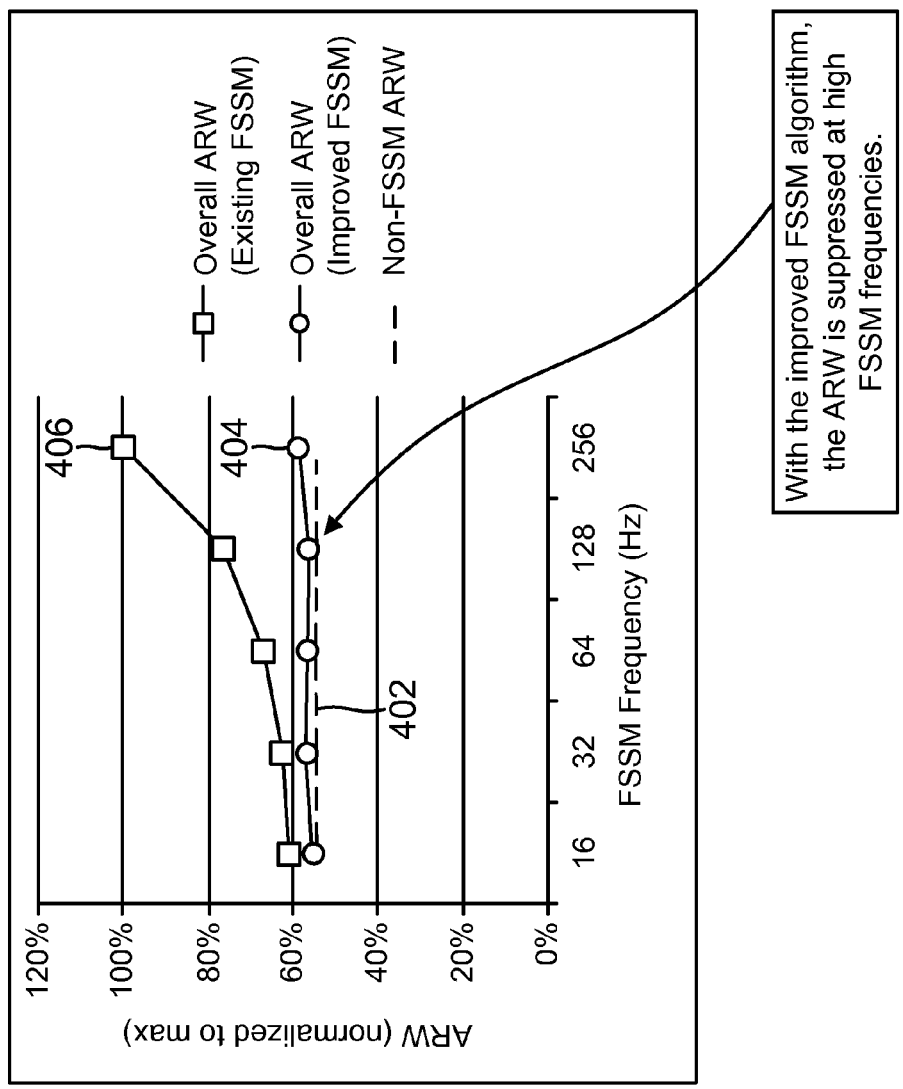
FIG. 4 is a graph illustrating example overall ARW curves for different IFOG implementations.

FIG. 4 is a graph illustrating overall ARW in the higher FSSM frequencies (16-256 Hz) for no FSSM (line 402), conventional FSSM (line 406), and the FSSM (line 404) discussed herein. As shown when FSSM is not implemented (line 402), there is no effect on ARW in the high frequencies. Conventional FSSM (line 406) causes the overall ARW to increase in the higher FSSM frequencies due to DAC throw-out error as discussed with respect to line 306 of FIG. 3. The FSSM discussed herein, however, reduces the DAC throw-out error and maintains a more constant ARW as the FSSM frequency increases. Accordingly, the FSSM discussed herein enables the FSSM frequency for an IFOG to be set at a higher level with less negative affect on ARW.

What is claimed is:

1. A method of modulating an input light beam of a fiber optic coil of an interferometric fiber optic gyroscope (IFOG), the method comprising:
   generating a bias modulation value for bias modulation of the input light beam;
   accumulating phase step corresponding to a difference in phase shift between outputs of the fiber optic coil in adjacent cycles of the IFOG to generate a phase step;
   generating a feedback signal for modulating the input light beam, the feedback signal corresponding to a sum of the bias modulation value and the phase step;
   intermittently jumping the phase step to suppress dead band, wherein jumping the phase step includes generating a feedback signal based on a jumped phase step; and
   if a bit flip was clocked into a digital to analog converter generating the feedback signal at the beginning of a cycle in which the jumped phase step is implemented, at least one of re-introducing a rate difference corresponding to the bit flip, altering the timing of the bit flip, or altering the timing of the generating a feedback signal based on the jumped phase step.

2. The method of claim 1, wherein jumping the phase step includes at least a first cycle followed immediately by a second cycle, wherein the jumped phase step is implemented in the first cycle and the bit flip is clocked in at the beginning of the first cycle, and wherein re-introducing a rate difference corresponding to the bit flip includes doubling a rate difference determined by a rate demodulator in the second cycle.

3. The method of claim 2, wherein doubling a rate difference includes doubling a gain applied to an output of the rate demodulator.

4. The method of claim 1, wherein jumping the phase step includes at least a first cycle followed immediately by a second cycle, wherein the jumped phase step is implemented in the first cycle and the bit flip is clocked in at the beginning of the first cycle, and wherein re-introducing a rate difference corresponding to the bit flip includes adding a rate difference determined by a rate demodulator in the second cycle to a subsequent cycle.

5. The method of claim 1, wherein altering the timing of the generating a feedback signal based on the jumped phase step includes:
   delaying to a subsequent cycle, the generating a feedback signal based on the jumped phase step.

6. The method of claim 1, wherein altering the timing of the bit flip includes:
   delaying the bit flip to a subsequent cycle.

7. The method of claim 1, wherein the phase step includes a whole value which is one or more most significant bits of the phase step and a fractional value which is the remaining least significant bits of the phase step, wherein the number of the one or more most significant bits in the whole value is the number of bits operated on by the digital to analog converter which generates the feedback signal,
   wherein the jumped phase step has a whole value configured to cause a phase jump in the feedback signal and a fractional value corresponding to the fractional value from a phase step of a cycle immediately preceding the cycle in which the jumped phase step is implemented.

8. The method of claim 7, wherein creating a jumped phase step includes:
   generating a phase jump impulse including the whole value configured to cause a phase jump in the feedback signal; and
   summing the phase jump impulse with the fractional value from the phase step of the cycle immediately preceding the cycle in which the jumped phase step is implemented.

9. The method of claim 1, wherein jumping the phase step includes:
   during a first cycle of the IFOG:
      demodulating the output of the fiber optic coil to determine a rate difference between the output and a previous output of the fiber optic coil;
      accumulating the rate difference with a prior raw rate to update a raw rate;
      storing the updated raw rate as a first cycle raw rate;
      creating the jumped phase step; and
      generating a feedback signal for the first cycle from a sum of a first cycle bias modulation value and the jumped phase step;
   during a second cycle, the second cycle immediately following the first cycle:
      storing an updated raw rate for the second cycle as a second cycle raw rate;
   during a third cycle, the third cycle immediately following the second cycle:
      discarding a raw rate for the third cycle; and
      accumulating the first cycle raw rate with a phase step from the second cycle to generate a third cycle phase step; and
      generating a feedback signal for the third cycle from a sum of a third cycle bias modulation value and the third cycle phase step;
   during a fourth cycle, the fourth cycle immediately following the third cycle:
      discarding a raw rate for the fourth cycle; and
      accumulating the second cycle raw rate with a phase step from the third cycle to generate a fourth cycle phase step; and
      generating a feedback signal for the fourth cycle from a sum of a fourth cycle bias modulation value and the fourth cycle phase step.

10. An interferometric fiber optic gyroscope (IFOG) comprising:
    a fiber optic coil;
    a light source configured to generate a light beam for input into the fiber optic coil;
    a phase modulator to modulate the light beam;
    a photodetector to convert an output light signal from the fiber optic coil into an electrical signal; and
    demodulating electronics configured to provide a signal indicative of a rotation rate sensed by the fiber optic coil and to generate a feedback signal for the phase modulator, the demodulating electronics configured to:
       generate a bias modulation value for bias modulation of the input light beam;

with a phase step accumulator having an input coupled to a rate accumulator via a switch, accumulate phase step corresponding to a difference in phase shift between outputs of the fiber optic coil in adjacent cycles of the IFOG to generate a phase step;

generate a feedback signal for modulating the input light beam, the feedback signal corresponding to a sum of the bias modulation value and the phase step;

intermittently operate the switch to couple the input of the phase step accumulator to a jumed phase step to jump the phase step to suppress dead band, wherein jumping the phase step includes generating a feedback signal based on a jumped phase step; and if a bit flip was clocked into a digital to analog converter generating the feedback signal at the beginning of a cycle in which the jumped phase step is implemented, at least one of re-introduce a rate difference corresponding to the bit flip, alter the timing of the bit flip, or alter the timing of the generating a feedback signal based on the jumped phase step.

11. The IFOG of claim 10, wherein jump the phase step includes at least a first cycle followed immediately by a second cycle, wherein the jumped phase step is implemented in the first cycle and the bit flip is clocked in at the beginning of the first cycle, and wherein re-introduce a rate difference corresponding to the bit flip includes doubling a rate difference determined by a rate demodulator in the second cycle.

12. The IFOG of claim 11, wherein double a rate difference includes double a gain applied to an output of a rate demodulator.

13. The IFOG of claim 10, wherein jump the phase step includes at least a first cycle followed immediately by a second cycle, wherein the jumped phase step is implemented in the first cycle and the bit flip is clocked in at the beginning of the first cycle, and wherein re-introduce a rate difference corresponding to the bit flip includes adding a rate difference determined by a rate demodulator in the second cycle to a subsequent cycle.

14. The IFOG of claim 10, wherein alter the timing of the generate a feedback signal based on the jumped phase step includes:
delay to a subsequent cycle, the generate a feedback signal based on the jumped phase step.

15. The IFOG of claim 10, wherein alter the timing of the bit flip includes:
delay the bit flip to a subsequent cycle.

16. The IFOG of claim 10, wherein the phase step includes a whole value which is one or more most significant bits of the phase step and a fractional value which is the remaining least significant bits of the phase step, wherein the number of the one or more most significant bits in the whole value is the number of bits operated on by the digital to analog converter which generates the feedback signal,
wherein the jumped phase step has a whole value configured to cause a phase jump in the feedback signal and a fractional value corresponding to the fractional value from a phase step of a cycle immediately preceding the cycle in which the jumped phase step is implemented.

17. The IFOG of claim 16, wherein create a jumped phase step includes:
generate a phase jump impulse including the whole value configured to cause a phase jump in the feedback signal; and sum the phase jump impulse with the fractional value from the phase step of the cycle immediately preceding the cycle in which the jumped phase step is implemented.

18. The IFOG of claim 10, wherein jump the phase step includes:
during a first cycle of the IFOG:
demodulate the output of the fiber optic coil to determine a rate difference between the output and a previous output of the fiber optic coil;
accumulate the rate difference with a prior raw rate to update a raw rate;
store the updated raw rate as a first cycle raw rate;
create a jumped phase step; and
generate a feedback signal for the first cycle from a sum of a bias modulation value and the jumped phase step;
during a second cycle, the second cycle immediately following the first cycle:
store an updated raw rate for the second cycle as a second cycle raw rate;
during a third cycle, the third cycle immediately following the second cycle:
discard a raw rate for the third cycle; and
accumulate the first cycle raw rate with a phase step from the second cycle to generate a third cycle phase step; and
generate a feedback signal for the third cycle from a sum of a bias modulation value and the third cycle phase step;
during a fourth cycle, the fourth cycle immediately following the third cycle:
discard a raw rate for the fourth cycle; and
accumulate the second cycle raw rate with a phase step from the third cycle to generate a fourth cycle phase step; and
generate a feedback signal for the fourth cycle from a sum of a bias modulation value and the fourth cycle phase step.

19. A method of jumping a phase step to suppress dead band during modulation of an input light beam of a fiber optic coil of an interferometric fiber optic gyroscope (IFOG), the method comprising:
during a first cycle of the IFOG:
demodulating a first cycle output of the fiber optic coil to determine a first cycle rate difference between the first cycle output and a previous output of the fiber optic coil;
accumulating the first cycle rate difference with a prior raw rate to generate a first cycle raw rate;
storing the first cycle raw rate;
creating a jumped phase step;
generating a first cycle bias modulation value for bias modulation of the input light beam; and
generating a first cycle feedback signal from a sum of the first cycle bias modulation value and the jumped phase step;
during a second cycle, the second cycle immediately following the first cycle:
demodulating a second cycle output of the fiber optic coil to determine a second cycle rate difference between the second cycle output and the first cycle output of the fiber optic coil;
accumulating the second cycle rate difference with the first cycle raw rate to generate a second cycle raw rate;
storing second cycle raw rate;

holding a second cycle phase step at the jumped phase step;
generating a second cycle bias modulation value for bias modulation of the input light beam;
generating a second cycle feedback signal from a sum of the second cycle bias modulation value and the second cycle phase step;
during a third cycle, the third cycle immediately following the second cycle:
discarding a raw rate for the third cycle; and
accumulating the first cycle raw rate with the second cycle phase step to generate a third cycle phase step; and
generating a third cycle bias modulation value for bias modulation of the input light beam;
generating a third cycle feedback signal from a sum of the third cycle bias modulation value and the third cycle phase step;
during a fourth cycle, the fourth cycle immediately following the third cycle:
discarding a raw rate for the fourth cycle; and
accumulating the second cycle raw rate with the third cycle phase step to generate a fourth cycle phase step;
generating a third cycle bias modulation value for bias modulation of the input light beam; and
generating a fourth cycle feedback signal from a sum of the fourth cycle bias modulation value and the fourth cycle phase step;
if a bit flip was clocked into a digital to analog converter generating the feedback signal at the beginning of the first cycle, at least one of re-introducing a rate difference corresponding to the bit flip, altering the timing of the bit flip, or altering the timing of the generating a feedback signal based on the jumped phase step;
wherein the phase step includes a whole value which is one or more most significant bits of the phase step and a fractional value which is the remaining least significant bits of the phase step, wherein the number of the one or more most significant bits in the whole value is the number of bits operated on by the digital to analog converter which generates the feedback signal,
wherein the jumped phase step has a whole value configured to cause a phase jump in the feedback signal and a fractional value corresponding to the fractional value from a phase step of a cycle immediately preceding the first cycle;
generating a phase jump impulse including the whole value configured to cause a phase jump in the feedback signal; and
summing the phase jump impulse with the fractional value from the phase step of the cycle immediately preceding the first cycle.

20. The method of claim 19, wherein re-introducing a rate difference corresponding to the bit flip includes doubling a rate difference determined by a rate demodulator in the second cycle, wherein doubling a rate difference includes doubling a gain applied to an output of the rate demodulator.

* * * * *